United States Patent
Anthon

(10) Patent No.: US 7,654,239 B2
(45) Date of Patent: *Feb. 2, 2010

(54) FUEL SAVING COMBUSTION ENGINE INSULATION METHOD AND SYSTEM

(75) Inventor: Anthony Anthon, Boca Raton, FL (US)

(73) Assignee: American Diesel & Gas, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/242,936

(22) Filed: Oct. 5, 2005

(65) Prior Publication Data

US 2006/0080958 A1 Apr. 20, 2006

Related U.S. Application Data

(60) Division of application No. 10/326,321, filed on Dec. 20, 2002, now Pat. No. 7,059,293, which is a continuation-in-part of application No. 10/029,339, filed on Dec. 20, 2001, now Pat. No. 6,510,833.

(51) Int. Cl.
*F02M 35/10* (2006.01)
*F02B 29/04* (2006.01)
*D03D 49/26* (2006.01)

(52) U.S. Cl. .................... 123/184.61; 123/184.53; 60/599; 138/149

(58) Field of Classification Search ............ 123/563, 123/540, 542, 184.61, 547, 269, 184.21, 123/184.53, 184.57, 198 E, 195 C; 60/599, 60/322; 244/171.7; 95/273; 138/149; 442/234; 174/68.1; 429/44

See application file for complete search history.

(56) References Cited

U.S. PATENT DOCUMENTS 1,827,035 A * 10/1931 Mottweiler et al. ......... 138/147
2,514,170 A * 7/1950 Robison et al. ............ 138/149

(Continued)

FOREIGN PATENT DOCUMENTS

CN 200971820 Y * 11/2007

(Continued)

OTHER PUBLICATIONS

Neue Werkstoffe und Entwicklungs-tools fur den Hitzeschutz, Cierocki K. et al. vol. 62, No. 12, Dec. 2001, pp. 1044-1050, XP 001111813 ISSN:0024-8525 + counterpart in English language.

*Primary Examiner*—Thai Ba Trieu
(74) *Attorney, Agent, or Firm*—Young & Thompson

(57) ABSTRACT

A method and apparatus for reducing fuel consumption in an internal combustion engine including gasoline, petrol and diesel engines used in trucks, cars and for pumps including the steps of providing a thermal insulation shield that includes reflective fabric over the exhaust manifold, around the intake plenum for intake air and intake air box, covering the turbo charger compressor with a heat insulating material that includes a reflective fabric layer and the turbo charger drive turbine housing except for the bearing area to greatly reduce heat build up in the engine compartment thereby reducing intake air temperature for increased engine efficiency. The invention has been found to increase fuel efficiency in large trucks by ten to fifteen percent. The materials are light weight and do not significantly increase engine weight or truck loan weight.

13 Claims, 4 Drawing Sheets

U.S. PATENT DOCUMENTS

| | | | | |
|---|---|---|---|---|
| 3,006,403 | A * | 10/1961 | Cooper et al. | 442/234 |
| 3,030,250 | A * | 4/1962 | Losse | 138/149 |
| 3,303,994 | A * | 2/1967 | Masashi | 417/409 |
| 3,740,247 | A * | 6/1973 | Schweigert et al. | 427/387 |
| 3,806,391 | A * | 4/1974 | Clay et al. | 156/279 |
| 3,863,445 | A | 2/1975 | Heath | 60/299 |
| 3,892,212 | A | 7/1975 | Tamai et al. | 123/547 |
| 3,916,860 | A * | 11/1975 | Nakano et al. | 123/547 |
| 3,946,764 | A | 3/1976 | Hubbell, III | 138/149 |
| 4,835,866 | A | 6/1989 | Nagashima | 123/73 AD |
| 4,903,645 | A | 2/1990 | Borger | 123/184.61 |
| 4,925,134 | A * | 5/1990 | Keller et al. | 244/171.7 |
| 5,038,725 | A * | 8/1991 | Okazaki et al. | 123/184.61 |
| 5,245,955 | A | 9/1993 | Husted | 123/184.61 |
| 5,269,143 | A | 12/1993 | Cikanek et al. | 60/599 |
| 5,447,130 | A * | 9/1995 | Kawamura | 123/269 |
| 5,472,463 | A | 12/1995 | Herman et al. | 123/198 E |
| 5,538,571 | A * | 7/1996 | Miyajima | 156/73.1 |
| 5,603,297 | A | 2/1997 | Wolf et al. | 123/195 C |
| 5,649,510 | A | 7/1997 | Linze | 123/198 E |
| 5,680,757 | A | 10/1997 | Pirchi | 60/299 |
| 5,987,882 | A | 11/1999 | Voss et al. | 60/274 |
| 6,024,188 | A * | 2/2000 | Yamaguchi et al. | 123/184.61 |
| 6,092,499 | A * | 7/2000 | Spannbauer | 123/184.61 |
| 6,319,298 | B1 * | 11/2001 | Ng-Gee-Quan | 55/331 |
| 6,438,949 | B1 * | 8/2002 | Nozaki | 60/322 |
| 6,510,833 | B1 * | 1/2003 | Anthon | 123/198 E |
| 6,920,867 | B2 * | 7/2005 | Cutts et al. | 123/184.61 |
| 6,966,395 | B2 * | 11/2005 | Schuehmacher et al. | 180/185 |
| 7,000,583 | B2 * | 2/2006 | Kino et al. | 123/184.53 |
| 7,152,633 | B2 * | 12/2006 | White | 138/149 |
| 7,478,532 | B2 * | 1/2009 | Martin et al. | 60/605.1 |
| 2005/0211095 | A1 * | 9/2005 | Zambrano et al. | 95/273 |
| 2005/0217625 | A1 * | 10/2005 | Niaken et al. | 123/184.21 |
| 2007/0114055 | A1 * | 5/2007 | Herborth et al. | 174/68.1 |
| 2007/0238008 | A1 * | 10/2007 | Hogan et al. | 429/44 |
| 2008/0169038 | A1 * | 7/2008 | Sellis et al. | 138/149 |

FOREIGN PATENT DOCUMENTS

| | | | |
|---|---|---|---|
| DE | 3518493 | A * | 11/1986 |
| DE | 1 984 9366 | | 4/2000 |
| DE | 10323731 | A1 * | 12/2004 |
| EP | 0 892 169 | | 1/1999 |
| EP | 1074699 | A2 * | 2/2001 |
| GB | 2267329 | A * | 12/1993 |
| JP | 55-176437 | | 12/1980 |
| JP | 56-065131 | | 6/1981 |
| JP | 60-132027 | A | 7/1985 |
| JP | 61-026628 | | 2/1986 |
| JP | 9-151742 | A | 6/1997 |
| JP | 10-274115 | A | 10/1998 |
| JP | 2001-065363 | A | 3/2001 |
| JP | 2004293361 | A * | 10/2004 |
| JP | 2005083270 | A * | 3/2005 |
| JP | 2005273511 | A * | 10/2005 |
| JP | 2007127067 | A * | 5/2007 |
| TW | 267438 | B1 * | 12/2006 |

* cited by examiner

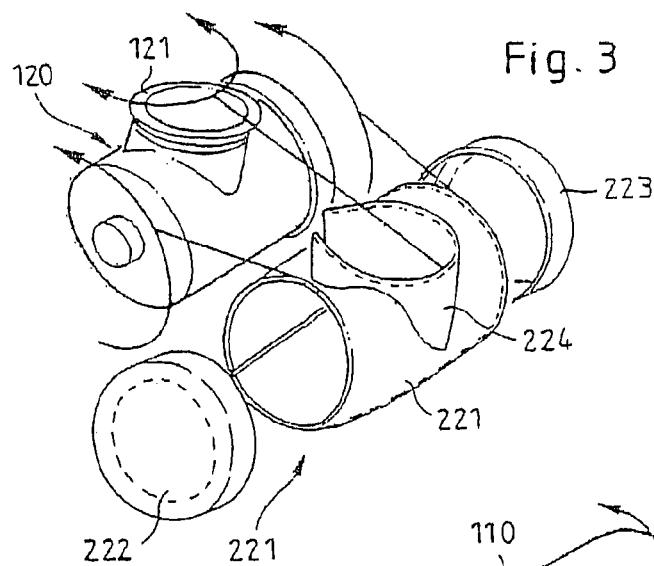
Fig. 3
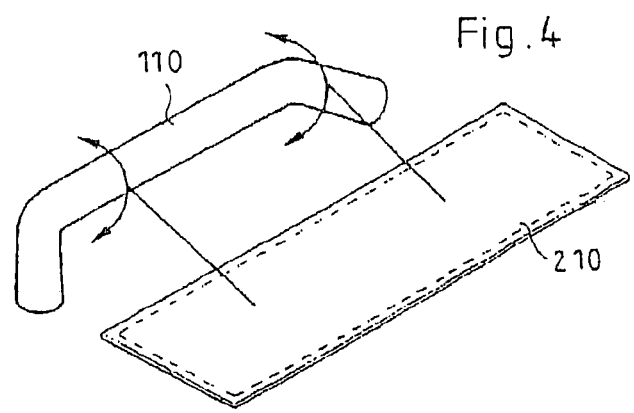
Fig. 4
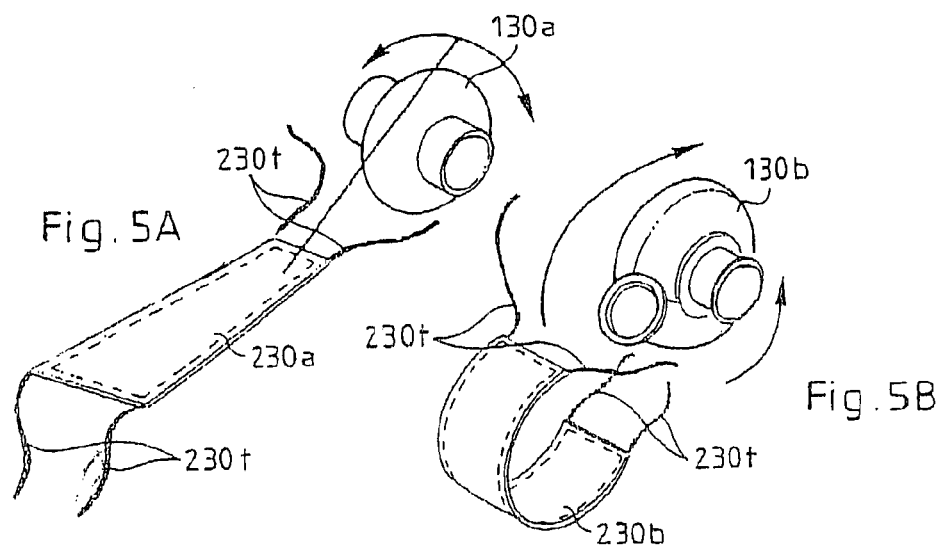
Fig. 5A
Fig. 5B

FUEL SAVING COMBUSTION ENGINE INSULATION METHOD AND SYSTEM

CROSS-REFERENCE TO RELATED APPLICATION

This application is a division of co-pending application Ser. No. 10/326,321, filed on Dec. 20, 2002, which is a continuation-in-part of Ser. No. 10/029,339, filed on Dec. 20, 2001, the entire contents of which are hereby incorporated by reference.

BACKGROUND OF THE INVENTION

1. Field of the Invention

The present invention relates to internal combustion engines, in particular diesel engines but also gasoline or petrol engines and particularly a method and apparatus for reducing the fuel consumption of the engine.

2. Description of Related Art

Internal combustion engines such as diesel engines and gasoline, also known as petrol, engines are widely used to power vehicles including trucks and cars. Intake air and fuel constitute a combustion charge which is burned in the engine to produce mechanical energy which imparts rotational movement to the crankshaft to propel the vehicle and power other systems of the vehicle.

Intake air is supplied to the internal combustion engine by way of an intake air system which includes sections of an intake air conduit or passage and various components depending on the type of engine. In the case of a diesel engine, the intake air system typically includes an airbox which is normally located in the engine compartment and into which enters ambient air from outside the vehicle. The intake air conduit or passage carries the intake air from the airbox ultimately to an intake air manifold which is in communication with the air intake ports of the combustion chambers of the engine.

A first section of the intake air conduit or passage is typically connected to a compressor of a turbocompressor to increase the pressure and therefore density of the intake air which is supplied by one or more other sections of the intake air conduit or passage to the intake air manifold. In a diesel engine the intake air is drawn from the manifold directly into the combustion chamber or chambers of the engine during the expansion stroke and compressed and mixed with the fuel during the compression stroke. After combustion of the fuel air mixture, the products of combustion or exhaust gases, exit the combustion chamber or chambers to an exhaust manifold and then to an exhaust gas pipe typically equipped with a muffler and catalytic converter. In addition, an intercooler for cooling the intake air is often provided between the compressor and the intake air manifold.

For a gasoline or petrol engine, different components are disposed along the intake air conduit or passage. Intake air and fuel are mixed in a carburetor before entering the combustion chamber(s) or directly injected into the chamber(s). The turbocharger is optional equipment and may be replaced by a supercharger and intercoolers are normally not used.

The internal combustion engine for a car or truck is generally located at the front of the vehicle inside an engine compartment which is covered by a metal access hood. A running combustion engine which has an engine block made of cast iron or aluminum gives off a large amount of heat which is conducted or radiated throughout the engine compartment. Temperatures in the engine compartment may exceed 300.degree. F. The heat generated inside the engine compartment is conducted and/or radiated intake air conduit or passage which in turn considerably increases the temperature of intake air delivered to the engine which may exceed 200.degree. F.

When the engine is equipped with a turbocharger the high temperature and velocity exhaust gases (temperature is 200.degree. F.) from the engine block are fed to a turbine which drives the compressor used to increase the density of the intake air. The turbine of a turbocharger operates at very high temperatures (in the excess of 800.degree. F.) and the turbocharger generates additional intense radiant heat inside the engine compartment. Also, the deviation of the exhaust gas conduit to carry those gases to and from the turbine increases the heat transfer surface between the exhaust gas conduit and the time the exhaust gases remain inside the engine compartment.

Insulating wraps have been used for exhaust headers to decrease the heat generated inside the engine compartment, such as those manufactured by Design Engineering, Inc. and Thermo-Tec. Such conventional high temperature fiber insulating wraps are wrapped around the tubes of the header and secured with clamps. They increase the temperature of the exhaust gases and improve engine performance. By increasing the temperature of the exhaust gases, they also tend to reduce the heat radiated to the engine compartment.

The cost of operating vehicles is high owing the high cost of fuel for internal combustion engines. Internal combustion engines also have poor fuel efficiency. The cost of fuel for powering internal combustion engines of cars and trucks is a major concern for the industrialized world. The problem of fuel efficiency of internal combustion engines is long standing.

An object of the present invention is to improve significantly fuel efficiency of diesel or gasoline internal combustion engines for cars and trucks, as well as ships, boats or other means of locomotion, and for other commercial and industrial use, such as for power generators and industrial pumps.

Another object of the invention is a method and system of improving fuel efficiency of internal combustion engines at relatively low cost, and which may be retrofitted or adopted as part of original equipment.

Another object of the present invention is a method and system for improving fuel efficiency of internal combustion engines regardless of type or construction of the engine, the construction or makeup of the intake air system and in particular the intake air conduit or passage and components disposed along the intake air conduit or passage, including equipment such as a turbocharger, supercharger or intercooler.

According to an aspect of the present invention, a method and system are provided for reducing or minimizing the increase the temperature of intake air flowing through the intake air system by wrapping or covering the intake air conduit or passage to the combustion chamber(s) of the engine with thermal shielding to protect it from the heat radiated and conducted inside the engine compartment.

According to another aspect of the invention, thermal shielding is selectively wrapped on the turbine and compressor of the turbocharger to prevent turbine heat being radiated and conducted to the engine compartment and in the case of the compressor to shield the intake air being compressed from the intense turbine heat and elevated heat inside the engine compartment.

According to still another aspect of the invention, the exhaust manifold is also wrapped or covered with thermal shielding reducing the heat radiated and conducted by the exhaust gases to the engine compartment and thereby to the intake air conveyed by the intake air system until it reaches the combustion chamber(s) of the engine.

The intake air conduit or passage is wrapped with a thermal shield comprising an outer heat radiating or reflecting layer and an inner thermal insulating layer. The radiating or reflecting layer radiates heat away from the intake air conduit or passage and thereby away from the intake air flowing therethrough. The thermal insulating layer provides a thermal gradient between the higher temperature outer thermal radiant layer and the conduit or passage around which the thermal shield is wrapped whereby the temperature of the inner surface of the thermal insulating layer has a substantially lower temperature than the temperature of the outer radiant layer. For example, temperatures of the order of 500.degree. F. may be found on the outer radiant layer and intake air temperatures of the order of 100.degree. F. may be found on the inner surface of the insulating layer.

For a diesel engine, the intake airbox may be wrapped with thermal shielding separately from the intake air conduit or passage sections and may comprise a plurality of mating or overlapping pieces of thermal shield corresponding to the size and configuration of various portions of the intake airbox. The inner face of the pieces of thermal shield preferably has an adhesive coating for facilitating the attachment to the corresponding part of the intake airbox. Similarly, the thermal shield for the intake air conduit or passage also has an adhesive coated inner face for facilitating the attachment to the outside surface of the intake air conduit or passage. Such a thermal shield is both lightweight and flexible permitting it to be adapted to the contour of surfaces to be wrapped. In addition, a metallic, and in particular an aluminum foil, adhesive tape may be applied over the thermal shield to cover the seams between pieces or even over some or the rest of the otherwise exposed thermal shield.

Similarly, the heat radiating components in the engine compartment, specifically the exhaust manifold, turbine and compressor of the turbocharger are wrapped or covered with multilayered insulating and radiating heat shields. Such thermal shields comprise an outer heat reflecting or radiating aluminized fabric and one or preferably two layers of thermal insulating material, in particular a non-woven web of insulating material and a woven cloth of insulating material, and an inner layer of wire mesh for reducing wear of the overlying layer of (friable), thermal insulating material which is subject to vibrations from the engine or other parts of the vehicle. Such a thermal shield will be thicker than the thermal shield used for shielding the intake air conduit or passage but sufficiently bendable to conform generally to the configuration of the exhaust manifold, turbine and compressor, respectively. Such a thermal shield may be secured with wires, safety straps or clamps of suitable heat resistant material, in practice of metal. The turbine and the compressor will preferably not be entirely wrapped with thermal shielding in order to leave exposed the bearings to avoid overheating and seizure. To avoid overheating, the side of the compressor housing remote from the turbine is preferably not wrapped with this heat shield.

The underside of the hood of the vehicle is also preferably insulated with the same thermal shield material used for the intake air conduit or passage and is likewise provided with an adhesive coated inner face which so it may be applied directly to the inside surface of the hood. The shielding of the hood will protect the engine compartment from the sun, particularly useful in hot climates. The shielding of the hood will also prevent heat from radiating through the hood, so that it is channeled downwardly out of the engine compartment to ambient air flowing beneath the vehicle.

Finally, the fuel lines may be insulated to protect them from the high temperatures in the engine compartment thereby preventing fuel vapor lock.

Testing on diesel engines wrapped with thermal shields in accordance with the invention resulted in a reduction of 15-20% in fuel consumption.

BRIEF DESCRIPTION OF THE DRAWINGS

FIG. 3 shows an exploded perspective view illustrating the thermal shielding of the intake airbox, shown in FIG. 1.

FIG. 4 shows an exploded perspective view of a thermal shield for a section of an intake air conduit or passage.

FIGS. 5A and 5B show an exploded perspective view illustrating thermal shielding of the turbine and the compressor of the turbocharger shown in FIG. 1.

DETAILED DESCRIPTION OF EMBODIMENTS OF THE INVENTION

Figure 1:
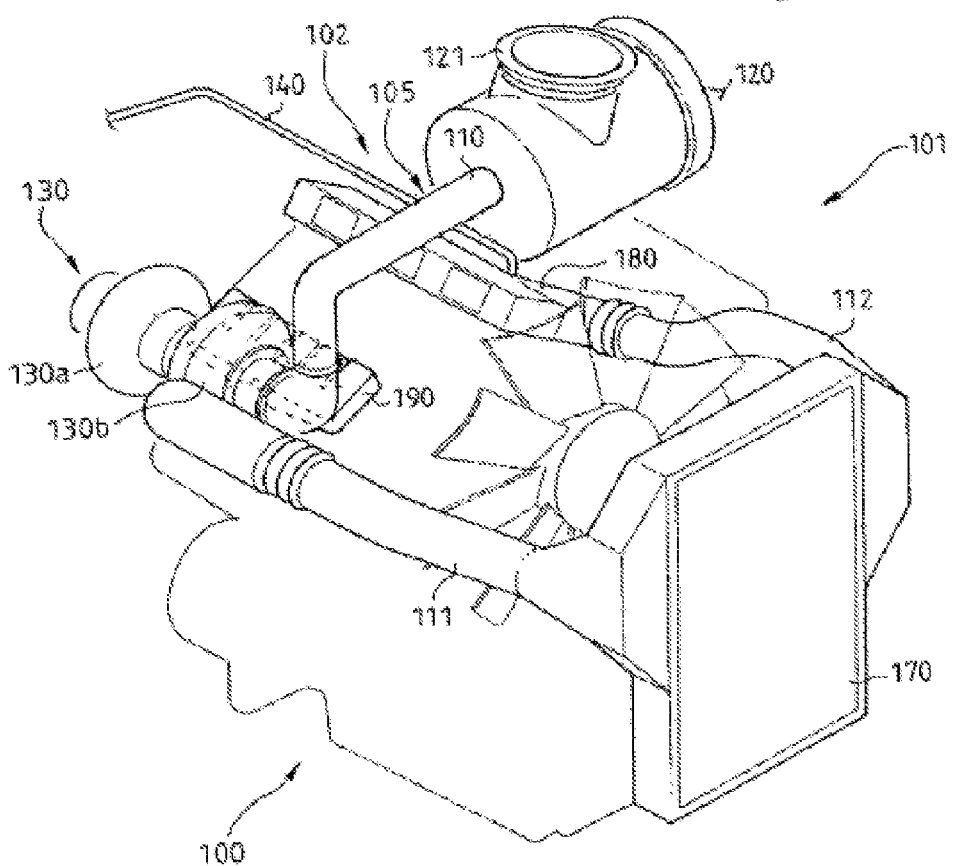
FIG. 1 shows a schematic perspective view of a diesel internal combustion engine equipped with a turbocharger and an intercooler.
Figure 2:
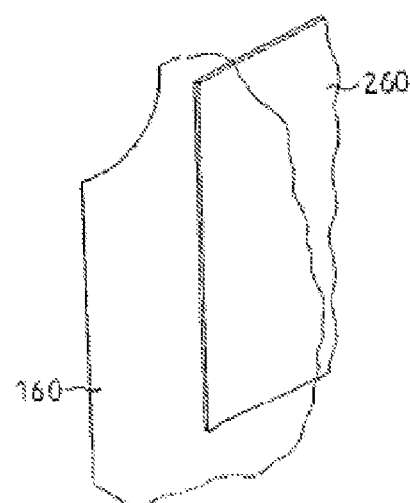
FIG. 2 shows a thermal insulating shield for the inside of the hood of the vehicle.
Figure 1A:
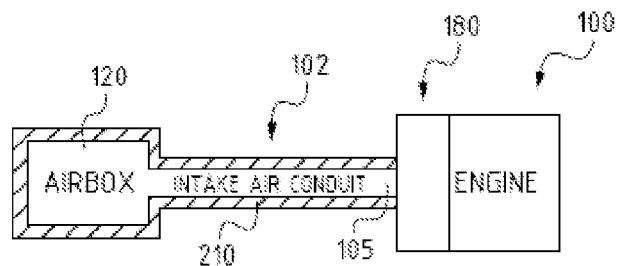
FIG. 1A provides a purely schematic illustration of an embodiment of the present device.
Figure 1B:
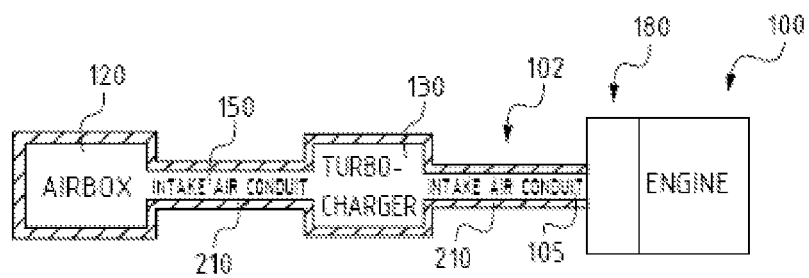
FIG. 1B provides a purely schematic illustration of another embodiment of the present system.
Figure 1C:
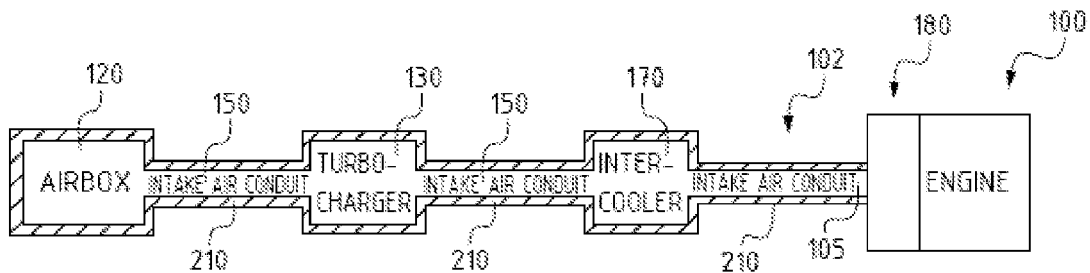
FIG. 1C provides a purely schematic illustration of yet another embodiment of the present system.

FIG. 1 illustrates a conventional diesel engine 100, in particular a Detroit Diesel Series 60 diesel engine which comprises an engine block 101 mounted in an engine compartment (not shown) along with various associated components. The engine compartment is closed from above by a metal access hood, not illustrated in FIG. 1. In operation, the engine generates a large amount of heat which is radiated and conducted throughout the engine compartment where temperatures may exceed 300.degree. F. for a heavy duty truck engine, such as the above mentioned diesel engine.

The intake air system 102 comprises an intake air conduit or passage 105 comprising intake air conduit or passage sections and various components. In the illustrated embodiment, the first component is an airbox 120 having an air inlet opening 121 which receives ambient air from outside the engine compartment through an air intake or scoop (not shown). The outlet end of the airbox 120 is connected to a first section 110 of the intake air conduit or passage 105, which carries intake air from the airbox to the inlet opening of a compressor 130b of a turbocharger 130. A second section 111 of the intake air conduit or passage is connected from the outlet of the compressor to the inlet of an intercooler 170. A third section 112 of the intake air conduit or passage 105 is connected from the outlet of the intercooler 170 to the intake air manifold 180 of the engine.

In case a supercharger is employed in lieu of a turbocharger, it will be similarly connected between the first and second sections of the intake air conduit or passage 105. Likewise, when the engine is not equipped with an intercooler, the first section of the intake air conduit or passage 105 may be connected directly to a carburetor, an intake manifold or an injector.

The intake air is compressed in compressor 130b of the turbocharger 130 thereby increasing intake air density. The compressor is driven by the turbine 130a. The compressed air is drawn into the intake air manifold 180 which is in communication with inlet ports of each of the cylinder(s) or combustion chamber(s) of the engine 100. Fuel is delivered to the engine by way of a fuel line 140.

According to one aspect of the invention, the entire intake air system 102 including the intake air conduit or passage 105, the airbox 120 and, if present, the intercooler 170 are wrapped or covered with a thermal shield 250 for shielding the intake air from the high temperatures and heat conducted and/or radiated inside the engine compartment. The same kind of thermal shield is used for substantially the entire intake air system including the intake air conduit or passage 105, the airbox 120 and the intercooler 170. This thermal shield 250 comprises a multilayer structure including an outer heat reflecting fabric 250a, such as an aluminized or other appropriate metal coated or laminated fabric, for example Gentex® aluminized fabric, and a non-woven insulating web 250b, such as ManniGlas® manufactured by Lydall, Inc. which is a high temperature glass fiber web with good heat performance and flexibility. The underside of the insulating textile 250b is coated with an adhesive 250c for bonding the thermal shield 250 to the intake air conduit or passage sections, the airbox 120 and the intercooler 170 if present. For facilitating the wrapping of the intake air conduit or passage sections, they may be removed from the compartment and reinstalled after being wrapped in a workshop.

FIG. 4 schematically illustrates a thermal shield section 210 of the above described structure which can be used to wrap the first section 110 of the intake air conduit or passage 105 which includes a pair of oblique bends and a straight intermediate portion. As illustrated by the arrows, the thermal shield section 210 is positioned along a generatrix of the first intake air conduit or passage section 110 and then wrapped around the section in opposite directions. Instead, smaller thermal shield sections may be cut for each of the bends and the straight intermediate portion. Alternatively, the section may be presized and shaped and simply fastened around the entire section 110. An aluminum adhesive tape may be used to cover any seams between thermal shield section(s) or cover the thermal shield partly or even entirely.

It goes without saying that any other intake air conduit or passage section(s) such as section 112 of the intake air conduit or passage 105 is wrapped with the same thermal shield material 250 and in the same manner, as just described.

The same thermal shield material 250 is also used for thermally shielding the airbox 120. The thermal shield for the airbox 120 is designated by reference numeral 220 and comprises a plurality of individual pieces, namely a main body piece 221, a pair of end pieces 222, 223 and a collar piece 224. The end pieces themselves may comprise two separate elements, one being a cylindrical ring and the other a circular endwall. Such pieces may be either pre-cut or custom-cut on site. Each of these pieces is formed from a flat section of the thermal shield material 250 of an appropriate size and configuration. They are individually secured by the adhesive coating to the body of the airbox 120, as indicated by the arrows in FIG. 3. To enhance good adhesive bonding of the thermal shield to the body of the airbox 120, the airbox is cleaned, for example with a brake cleaner, to remove oil, grease and/or grit. Alternatively, the section may be presized and shaped and simply fastened around the entire section 110.

When the engine includes an intercooler, such as intercooler 170, it too is thermally shielded with the same thermal shield material 250. Seams between portions of the thermal shield material may be covered with a metallic, in practice aluminum, foil adhesive tape and even some or all of the otherwise exposed thermal shield material.

Figure 8:
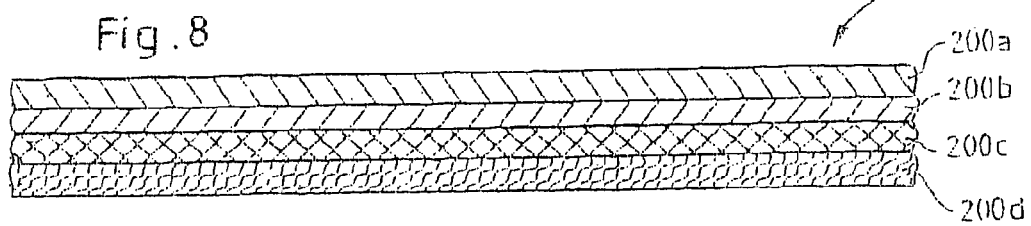
FIG. 8 shows a cross sectional view of a multilayer thermal shield for the exhaust manifold, the turbocharger turbine and compressor.
Figure 9:
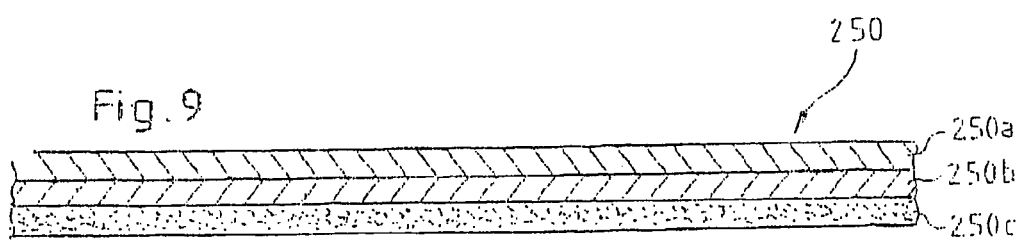
FIG. 9 shows a cross sectional view of a multilayer thermal shield for an intake air conduit or passage or the underside of the hood of the vehicle.

The exhaust manifold 190, the turbine 130a and the compressor 130b are thermally shielded with the thermal shield material 200 illustrated in FIG. 8. The thermal shield material 200 is a thermal insulating blanket comprising at least three and preferably four layers of material. The outermost layer 200a is a heat reflecting fabric, such as an aluminized or other appropriate metal coated or laminated fabric, for example a Gentex® aluminized heat shielding fabric. The second layer 200b is a heat resistant fiberglass insulation web known as ManniGlas® manufactured by Lydall, Inc. and which may withstand temperatures up to 1200° F. The third layer 200c is an insulating textile, for example Stevens Cloth™ which is a high temperature fiberglass lagging cloth. The fourth layer 200d comprises a wire mesh which is adapted to come into contact with the exhaust manifold 190 and intended to protect the otherwise friable fiberglass thermal insulating material from abrasion and vibrations of the exhaust manifold. In this case, the outermost layer 200a of metal coated or laminated heat reflecting fabric is not used to reflect the heat away from the exhaust manifold 190 but rather to contain the radiant heat generated by the very high temperature exhaust gases flowing through the exhaust manifold 190. The metal or laminated reflecting fabric also protects the underlying thermal insulating layers against fire caused by high temperature liquid, gas or particulate matter circulating in the engine compartment.

Figure 6:
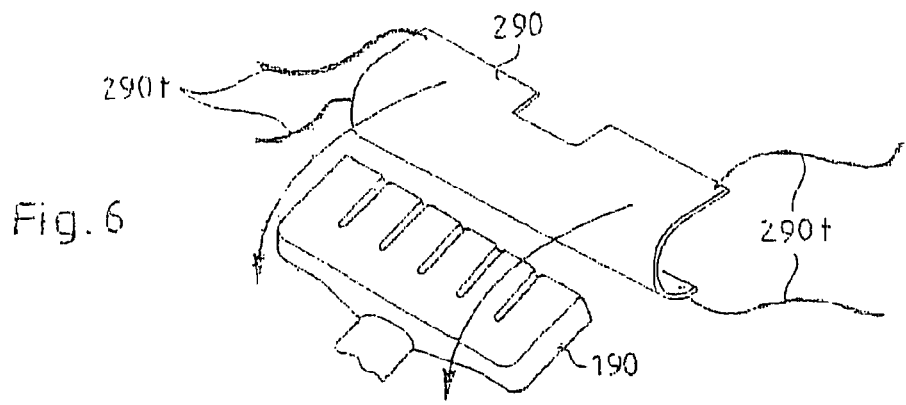
FIG. 6 shows an exploded perspective view illustrating the thermal shielding for an exhaust manifold.

The thermal shield material 200 is used to cover or wrap the exhaust manifold 190. The installation of a thermal shield wrap suitable for this purpose is illustrated in FIG. 6. The exhaust manifold insulation wrap 290 is a generally rectangular piece of the thermal shield material 200 of a size suitable for covering the outer surface of the exhaust manifold. The insulation wrap 290 is provided with a central cutout along one of the edges for receiving the exhaust gas pipe leaving the manifold 190. The insulating wrap 290 has, as shown, stainless steel or other heat resistant wire ties 290t at each of its four corners. The ties may be attached by sleeves or holes in the thermal shield material. The exhaust manifold insulation wrap 290 is installed as illustrated by the arrows so that it extends over the top, sides and longitudinal outerwall of the heater thus substantially entirely covering the exhaust manifold in order to confine the exhaust gas heat to the manifold and reduce radiation or conduction of this heat elsewhere in the engine compartment. After the insulation wrap 290 is in place, it is secured by twisting or knotting ties 290t or with some other tie fastener or the like. Alternatively, the exhaust manifold insulating wrap may be pre-fabricated to the shape and size of the exhaust manifold.

FIGS. 5A and 5B illustrate the installation of the thermal insulating blanket material 200 on the housing of the turbine 130a and the housing of the compressor 130b of the turbocompressor 130. The turbine housing insulation wrap 230a comprises a piece of the thermal insulating blanket material 200 suitably precut or custom-cut at the time of installation to conform to the configuration of the housing. This wrap is generally elongate as illustrated to be wrapped around the generally toroidal central portion of the housing of the turbine. Wire ties 230t of the type described above are pulled tight once the wrap is in place so that it conforms to the shape of and effectively covers the major part of the turbine housing, leaving exposed the bearing portions which would overheat if wrapped in the insulating blanket material. The ties are then secured together by twisting or knotting to hold the wrap in place. Obviously, other means of securing the wrap may be employed, including clamps, fasteners and even heat resistant metal foil adhesive tape. This wrap may be prefabricated to the desired size and shape of the particular housing.

The compressor insulating wrap 230b is also a suitably precut or custom-cut piece of the thermal insulating blanket material 200 adapted to conform generally to the configuration of the compressor housing. This wrap too is generally elongate to extend entirely around the swirl chamber of the compressor. Wire ties 230t are pulled tight once the wrap is in place, so that it conforms generally to the shape and effectively covers the major part of the compressor housing, leaving exposed the bearing portions for the reasons indicated above. In practice, the entire side of the compressor housing which faces away from the turbine will be left exposed to prevent overheating of the compressor. The wrap 230b is then secured in place with the ties or other suitable fastening means. Alternatively, a prefabricated wrap to the desired size and shape of the particular housing may be used.

According to a preferred aspect of the invention, the underside of the access hood 160 is also thermally insulated with the same thermal insulating and reflecting material used for wrapping the intake air conduit or passage and airbox. This thermal shield material 250 thus comprises an outer air reflecting fabric 250a, such as an aluminized coated or laminated fabric and a non-woven insulating web 250, for example ManniGlas® made by Lydall, Inc. and a temperature resistant adhesive coating 250 for adhesively bonding the thermal shield to the underside of the access hood. Thus, heat generated inside the engine compartment is reflected away from the hood and tends to be channeled downwardly to the ambient air flowing below the engine compartment. Also, this thermal shield insulates the engine compartment from the sun beating on the hood, especially in hot climates.

Tests on a Detroit Diesel Series 60 diesel engine with heat shielding as described above has demonstrated 15 to 20% reduction in fuel consumption under laboratory conditions. Road tests of trucks for several weeks in their normal working environment has shown a 10-15% improvement in fuel efficiency.

Figure 7:
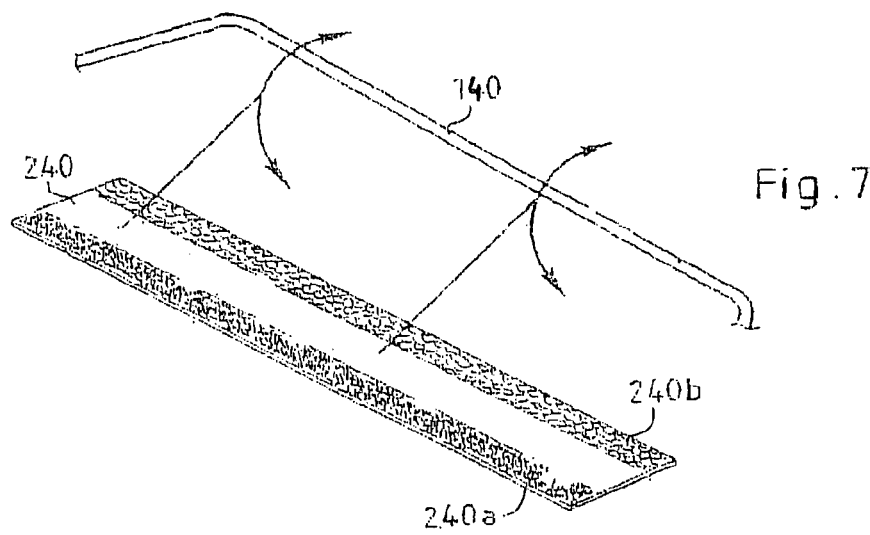
FIG. 7 shows an exploded perspective view of a thermal panel for wrapping a fuel line.

Also, the fuel line 140 may be wrapped with an insulating sheet material 240 having adhesive edge portions 240a, 240b, as illustrated in FIG. 7.

Testing has also revealed that the key factors are the reduction of temperature of intake air entering the compressor of the turbocharger through the thermal shielding of the intake air system and in particular the airbox and the conduit or passage between the airbox and the compressor as well as the turbocharger, that is both the turbine and the compressor.

Test No. 1

A truck powered by a Detroit Diesel Series 60 diesel engine was retrofitted with thermal shielding as described above and tested at the Detroit Diesel Test Facility in Miami, Fla., and compared to test results for the same engine without the thermal shielding. Those tests show that a mileage per gallon increase from 4.325 to 5.175 or 19.65% with the thermal shielding according to the invention.

Test No. 2

Two electric generators powered by two diesel combustion engines were tested with and without thermal insulation according to the present invention. The first diesel engine which was an uninsulated unit was run for 12.1 hours and used 66.8 gallons of diesel fuel which resulted in a gallons per hour of 5.5207. The second diesel engine was insulated and was run for 43.2 hours and used a total of 183.0 gallons of diesel fuel. The gallons per hour were 4.2381. Both units tested were 175 kW "hush power" generators running a single 60 ton Trane air conditioner. The total fuel savings per hour was 23.27%.

Although the invention has been particularly described in connection with a heavy duty diesel engine, it is also applicable to smaller diesel engines and even gasoline engines. The fuel efficiency of gasoline or petrol engines for conventional automobiles, SUVs, vans and small trucks with or without a supercharger as well as internal combustion engines used for industrial equipment, such as electric generators and pumps, with or without a turbocharger or supercharger, can be improved by implementing the thermal shielding according to the present invention.

Test No. 3

Temperatures at various locations were measured on a Detroit Diesel 60 Series diesel engine with and without thermal shielding according to the invention. The following table shows the results of these readings.

| Location of temperature measurement | Temperature at location without thermal shielding | Temperature at location with thermal shielding |
|---|---|---|
| Engine compartment | about 300° F. | about 120° F. |
| Turbine housing | Above 800° F. | between about 200° F. and 240° F. |
| Compressor housing | about 500° F. | about 200° F. |
| Exhaust manifold | between about 600° F. and 800° F. | about 120° F. |
| Intercooler (inside) | about 180° F. to 200° F. | about 230° F. |
| Intercooler (outside) | about 140° F.-150° F. | about 100° F. |
| Intake air conduit or passage (inside) | ambient temperature | ambient temperature |
| Intake air conduit or passage (outside) | about 240° F. | about 200° F. |
| Airbox | about 240.° F. | ambient temperature |
| Access hood | about 200° F. to about 240° F. | about 130° F. to 140.° F. |

The invention claimed is:

1. A method, of reducing any increase of temperature of intake air flowing through an intake air system to the combustion chamber(s) of an internal combustion engine mounted in an engine compartment, the intake air system including an intake air conduit having two sections, the method comprising the steps of: providing thermal shielding pre-configured for covering or wrapping of a first section of the intake air conduit extending from an airbox to an intake of a compressor of a turbocharger and a second section extending from an outlet of the compressor of the turbocharger to an intake air manifold of the engine, and covering or wrapping the first and second sections of the intake air conduit with the thermal shielding to shield intake air therein from heat generated inside the engine compartment, and wherein the housings of the turbine and compressor of the turbocharger are selectively wrapped to leave exposed bearing portions.

2. The method according to claim 1, wherein a side of the housing of the compressor facing away from the turbine is left exposed.

3. The method according to claim 1, further comprising applying thermal shielding to the airbox to insulate intake air therein from heat generated inside the engine compartment.

4. The method according to claim 1, further comprising applying thermal shielding to an exhaust manifold of the engine for reducing heat generated in the engine compartment by exhaust gas flowing through the exhaust manifold.

5. The method of claim 1, wherein the thermal shielding includes thermal insulation and a reflective material, the reflective material defining an outer surface of the thermal shielding for reflecting radiant heat away from intake air in the intake air conduit.

6. The method of claim 1, wherein the intake air conduit is a tubular member.

7. A method of reducing any increase of temperature of intake air flowing through an intake air system to the combustion chamber(s) of an internal combustion engine mounted in an engine compartment, the intake air system including an intake air conduit extending from an airbox to an intake air manifold of the engine and having a plurality of sections, the method comprising the steps of: providing thermal shielding pre-configured for covering or wrapping the plurality of the intake air conduit sections and covering or wrapping the plurality of intake air conduit sections with the thermal shielding to shield intake air therein from heat generated inside the engine compartment; and the plurality of the intake air conduit sections comprising a first, a second and a third section, the first section extending from the airbox to an inlet of a compressor of a turbocharger, the second section extending from an outlet of the compressor of the turbocharger to an inlet end of an intercooler and the third section extending from an outlet of the intercooler to the intake air manifold of the engine.

8. The method according to claim 7, further comprising applying thermal shielding to the airbox to insulate intake air therein from heat generated inside the engine compartment.

9. The method according to claim 7, further comprising applying thermal shielding to an exhaust manifold of the engine for reducing heat generated in the engine compartment by exhaust gas flowing through the exhaust manifold.

10. The method of claim 7, further comprising thermally shielding the intercooler.

11. The method of claim 7, wherein the thermal shielding includes thermal insulation and a reflective material, the reflective material defining an outer surface of the thermal shielding for reflecting radiant heat away from intake air in the intake air conduit.

12. The method of claim 7, wherein the intake air conduit is a tubular member.

13. The method according to claim 7, wherein the housings of the turbine and compressor of the turbocharger are selectively wrapped to leave exposed bearing portions.

\* \* \* \* \*